US012322173B2

(12) United States Patent
Young (10) Patent No.: US 12,322,173 B2
(45) Date of Patent: Jun. 3, 2025

(54) ENHANCED OBJECT DETECTION

(71) Applicant: TidalX AI Inc, San Ramon, CA (US)

(72) Inventor: Grace Calvert Young, Mountain View, CA (US)

(73) Assignee: TidalX AI Inc., Mountain View, CA (US)

(*) Notice: Subject to any disclaimer, the term of this patent is extended or adjusted under 35 U.S.C. 154(b) by 331 days.

(21) Appl. No.: 17/880,892

(22) Filed: Aug. 4, 2022

(65) Prior Publication Data

US 2024/0046637 A1   Feb. 8, 2024

(51) Int. Cl.
| G06V 20/05 | (2022.01) |
| A01K 61/13 | (2017.01) |
| A01K 61/80 | (2017.01) |
| G06T 7/11 | (2017.01) |
| G06T 7/70 | (2017.01) |
| G06V 10/22 | (2022.01) |
| G06V 10/25 | (2022.01) |

(52) U.S. Cl.
CPC .............. *G06V 20/05* (2022.01); *A01K 61/13* (2017.01); *A01K 61/80* (2017.01); *G06T 7/11* (2017.01); *G06T 7/70* (2017.01); *G06V 10/225* (2022.01); *G06V 10/25* (2022.01); *G06T 2207/20081* (2013.01); *G06V 2201/07* (2022.01)

(58) Field of Classification Search
None
See application file for complete search history.

(56) References Cited

U.S. PATENT DOCUMENTS

| 11,244,459 B2 | 2/2022 | Sato et al. |
| 2018/0263223 A1 | 9/2018 | Kodaira et al. |
| 2020/0170227 A1* | 6/2020 | Rishi ...................... G06V 40/20 |
| 2021/0289758 A1* | 9/2021 | Li ........................... A01K 61/95 |
| 2021/0289759 A1 | 9/2021 | Naval et al. |

FOREIGN PATENT DOCUMENTS

| WO | WO 2019/245722 | 12/2019 |
| WO | WO-2019245722 A1 * | 12/2019 |

OTHER PUBLICATIONS

International Search Report and Written Opinion in International Appln. No. PCT/US2023/028054, dated Oct. 17, 2023, 12 pages.

* cited by examiner

*Primary Examiner* — Delomia L Gilliard
(74) *Attorney, Agent, or Firm* — Fish & Richardson P.C.

(57) ABSTRACT

Methods, systems, and apparatus, including computer programs encoded on computer-storage media, for monocular underwater camera biomass estimation. In some implementations, an exemplary method includes obtaining an image of a fish captured by an underwater camera; identifying portions of the image corresponding to one or more areas of interest; extracting the portions of the image from the image; providing the portions of the image to a model trained to detect objects in the portions of the image; and determining an action based on output of the model indicating a number of object detections.

16 Claims, 3 Drawing Sheets

ENHANCED OBJECT DETECTION

FIELD

This specification generally relates to object detection, particularly detecting objects within aquaculture environments.

BACKGROUND

A population of farmed fish may include fish of varying sizes, shapes, and health conditions. In the aquaculture context, prior to harvesting, a worker may remove some fish from the fish pen and inspect them. The manual process of removing the fish from the fish pen for inspection is both time intensive and potentially harmful to the fish. In addition, because only a small portion of a fish population may be effectively inspected in this way, the true characteristics of the population remain unknown.

SUMMARY

In general, innovative aspects of the subject matter described in this specification relate to detecting objects in portions extracted from obtained images. The extracted portions, otherwise referred to as patches, can be immediately processed or stored for later processing depending on processing bandwidth and current, or projected, processing load. In an aquaculture environment, a system for enhanced object detection as described herein can perform a method that includes obtaining one or more images from an underwater camera, identifying patches of interest in the images, storing or providing the identified patches to an object detector.

In many environments, processing requirements for the obtained image may vary widely from one moment to the next. In aquaculture, a camera may obtain images of empty water for hours. In a flash, a school of fish can race past the camera. With processing constraints of a system, detections corresponding to each of the fish may be infeasible. As a consequence, without an enhanced system for detection, such a system may miss detections. When detecting for disease, loss of detections may result in fish not receiving medicine or treatment which may lead to death or continued spread of disease throughout a population.

To help solve this problem, the techniques herein describe extracting relevant patches, which are typically small portions of larger obtained images, for a given detection. In one case, a system can be implemented to detect parasites on fish. In this system, instead of processing entire images obtained from an environment, a processing device can extract relevant portions of obtained images for processing. The relevant portions can include representations of specific portions of the bodies of fish. The specific portions can include areas that are likely areas for parasite infection. The patches can be processed directly, more rapidly than processing an entire image, or can be stored, requiring less storage space compared to the entire images.

Object detections may be used to determine subsequent actions, e.g., controlling the amount of feed given to a fish population. Controlling the amount of feed can be accomplished by controlling a feed distribution system. Other actions can include identifying and isolating diseased fish or other sub-populations.

One innovative aspect of the subject matter described in this specification is embodied in a method that includes obtaining an image of a fish captured by an underwater camera; identifying portions of the image corresponding to one or more areas of interest; extracting the portions of the image from the image; providing the portions of the image to a model trained to detect objects in the portions of the image; and determining an action based on output of the model indicating a number of object detections.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include obtaining a type of object to be detected by the trained model.

In some implementations, actions include determining one or more of the areas of interest as areas that typically include the type of object to be detected. In some implementations, actions include storing one or more of the portions in memory; and providing the portions includes providing the portions from the memory to the model.

In some implementations, actions include determining one or more processors of a processing device running the model are available; and in response to determining the one or more processors of the processing device running the model are available, providing the portions from memory to the model. In some implementations, the objects include parasites.

In some implementations, the areas of interest include regions behind dorsal or adipose fins. In some implementations, actions include generating a value indicating a level of infestation within a population that includes the fish.

In some implementations, the value is generated for the population by a model trained to determine infestation for a given population using objects detected on a portion of the given population.

In some implementations, actions include detecting the fish within the image using a model trained to detect fish. In some implementations, the areas of interest include portions of the detected fish. In some implementations, the action includes adjusting a feeding system providing feed to the fish.

In some implementations, the action includes sending data indicating the output of the model to a user device, where the data is configured to, when displayed on the user device, present a user of the user device with a visual representation of disease in a population that includes the fish. In some implementations, determining the action includes determining to adjust a position or operation of an item of motorized equipment.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
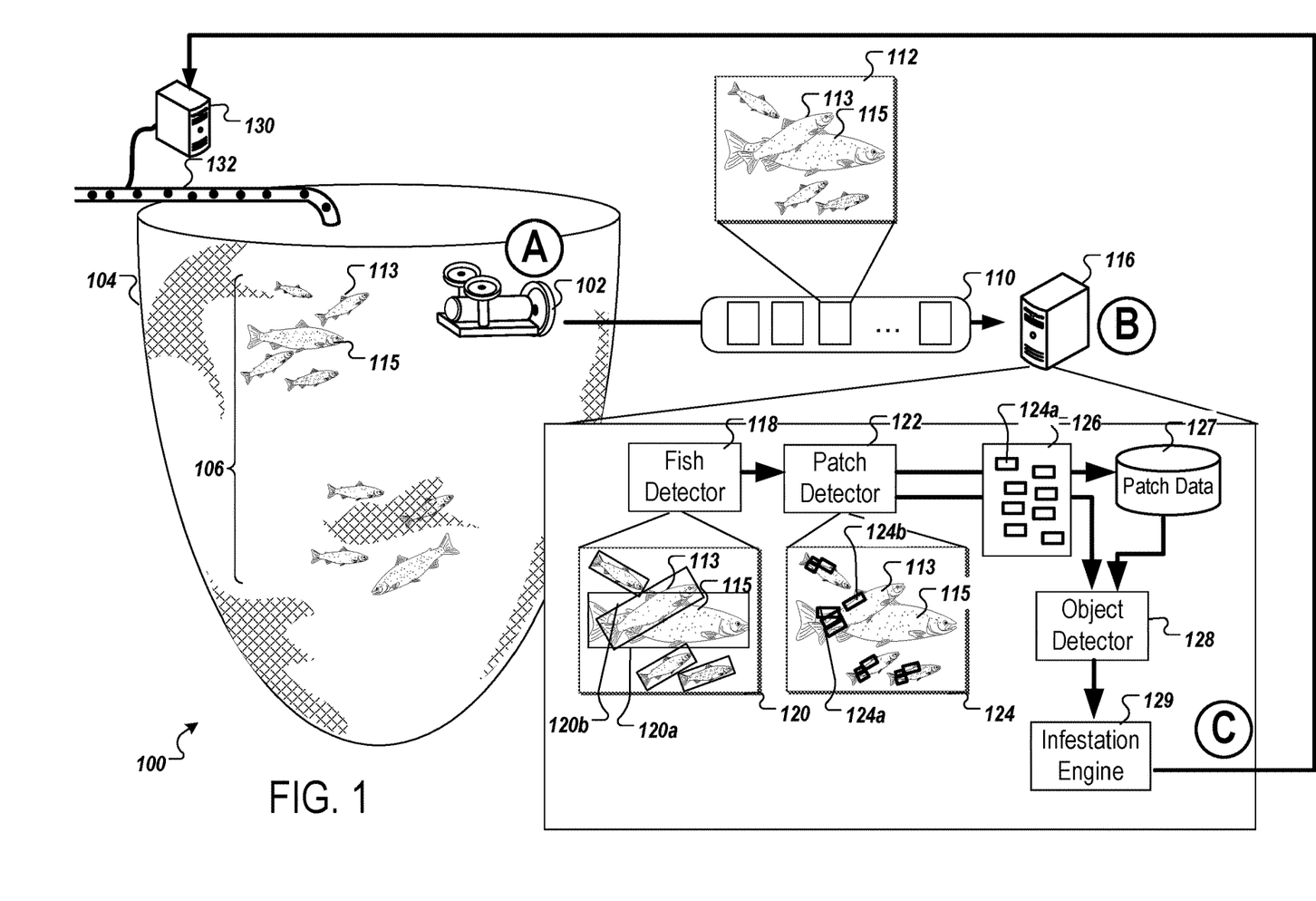
FIG. 1 is a diagram showing an example of a system that is used for enhanced object detection.

FIG. 1 is a diagram showing an example of a system 100 that is used for enhanced object detection. The system 100 includes a control unit 116 and an underwater camera device 102. Generally speaking, the control unit 116 obtains images captured by a camera of the camera device 102 and processes the images. The control unit 116 can be communicably connected to the camera device 102.

Obtained images can be large (e.g., 2,000 by 2,000 pixels, 3,000 by 3,000 pixels, among others) and include portions that are not relevant for object detections or classifications. The system 100 can improve efficiency (e.g., reduce storage, decrease computation time) by determining portions of obtained images that only include relevant details for object detection or classification. Identified portions can be processed asynchronously, e.g., when processors of the control unit 116 are not busy with other operations. By storing images, e.g., when the processors are busy for later detection, instead of discarding them or forcing the processors to process in real time to the detriment of other processes, the system 100 can improve accuracy of object detection within an environment by detecting objects that may otherwise have not been detected.

The control unit 116 can detect one or more objects and determine actions such as feed adjustment, sorting, model training, and user report feedback, among others using the one or more object detections. The example of FIG. 1 shows the control unit 116 determining a level of infestation using infestation engine 129 based on one or more object detections from object detector 128.

The system 100 also includes a feed controller unit 130 that controls the feed delivered by feed system 132. The feed controller unit 130 can include components configured to send control messages to actuators, blowers, conveyers, switches, or other components of the feed system 132. The control messages can be configured to stop, start, or change a meal provided to fish 106 in pen 104.

In this example, the camera device 102 includes propellers to move the camera device 102 around the fish pen 104. In general, the camera device 102 may use any method of movement including ropes and winches, waterjets, thrusters, tethers, buoyancy control apparatus, chains, among others.

In some implementations, the camera device 102 is equipped with the control unit 116 as an onboard component, while in other implementations, the control unit 116 is not affixed to the camera device 102 and is external to the camera device 102. For example, the camera device 102 may provide images, e.g., image 112, over a network to the control unit 116. Similarly, the control unit 116 can provide return data, including movement commands to the camera device 102 over the network.

Stages A through C of FIG. 1, depict image data 110, including image 112, obtained by the camera device 102 that are processed by the control unit 116. The image 112 includes representations of fish including the fish 113 and 115. The control unit 116 can include one or more processors configured to perform operations corresponding to a fish detector 118, a patch detector 122, an object detector 128, or an infestation engine 129. Similarly, the control unit 116 can be communicably connected to one or more remote processing components configured to perform operations for one or more of the fish detector 118, the patch detector 122, the object detector 128, or the infestation engine 129. Patch data 127 can be stored onboard the control unit 116 or within memory of a remote device.

In stage A, the camera device 102 obtains the image data 110 including image 112 of fish, including the fish 113 and 115, within the pen 104. In some implementations, the image data 110 includes video data obtained by one or more cameras of the camera device 102. The camera device 102 provides the data 110 to the control unit 116. Although image 112 shows the fish 113 and 115 in a side profile view, images of fish obtained by the camera device 102 may include fish in any conceivable pose including head on, reverse head on, or skewed.

In stage B, the control unit 116 processes the images of the data 110, including the image 112. The control unit 116 provides the data 110 to the fish detector 118. The fish detector 118 detects one or more fish represented in the image 112. In some implementations, the fish detector 118 generates bounding boxes around detected fish. Of course, other shapes, including bounding ovals, circles, or the like, can be used. In some implementations, the fish detector 118 determines locations corresponding to outer edges of detected objects and stores the locations as an object detection.

In some implementations, the control unit 116 downsamples the data 110. For example, the control unit 116 can downsample the data 110 by generating images similar to the images of the data 110 (e.g., representing the same features) but with fewer pixels. One or more pixels can be grouped based on their value to generate a single pixel. Values of the single pixel can be a type of average using the values of the one or more pixels. In general, the control unit 116 can decrease the resolution of the data 110 before processing using the fish detector 118, patch detector 122, object detector 128, infestation engine 129, or the like. Downsampling can help reduce storage requirements and decrease processing time.

Example bounding boxes, e.g., box 120a for the fish 115 and box 120b for the fish 113, are shown in image 120. Data indicating bounding boxes is provided by the fish detector 118 to the patch detector 122. The patch detector 122 obtains the fish detection data and detects one or more patches of relevant data. The relevancy of data can depend on the type of detections performed by the control unit 116. For example, for detecting sea lice or other ectoparasites, the control unit 116 can obtain information instructing the control unit 116 to detect one or more types of ectoparasites in the images of the data 110. The information can be provided by a user or as part of an automated detection program.

Based on a type of ectoparasite or other object to be detected, the patch detector 122 can extract patches on regions of fish corresponding to the given type. For example, sea lice can be more likely to congregate on specific portions of specific fish compared to other portions. In some implementations, the patch detector 122 obtains an indication of an object to be detected and a type of fish (e.g., a type of fish detected by the fish detector 118). For example, the object to be detected can be sea lice and the type of fish can be salmon. Using the type of object and type of fish, the patch detector 122 can determine one or more portions of images to be extracted as patches for immediate or later processing.

The patch detector 122 can store the patches 126 detected by the patch detector 122 or provide the patches 126 to the object detector 128. In some implementations, the patch detector 122 provides all of the patches 126 to a database as the patch data 127. In some implementations, the patch detector 122 provides one or more of the patches 126 to the object detector 128 and stores one or more of the patches 126 as the patch data 127. Patch data 127 can be stored in a memory storage device of the control unit 116 or a memory storage device of a device communicably connected to the control unit 116.

In some implementations, patches include altered image characteristics. For example, the control unit 116 can mask a portion of extracted patches, e.g., patches 126. In one case, the control unit 116 can mask a portion of the extracted patches that does not represent a body of an object of interest (e.g., a fish, cow, among others). The mask can set pixel values to a predetermined value. Masked images may be compressed to minimize storage requirements by storing a first set of one or more masked pixels as a second set of one or more values where the second set of one or more values occupies less storage space than the first set of one or more masked pixels. The control unit 116 can apply color filters or the like to visually alter patches, e.g., to optimize later processing, such as object detection.

In some implementations, the control unit 116 determines which of the patches 126 to store, process, or discard. The control unit 116 can determine which of the patches 126 to store, process, or discard using data, e.g., capabilities of the camera, capabilities of a cloud processing device, quality of a patch, bandwidth or processing load of one or more processors operating the object detector 128, among others. For example, the control unit 116 can determine a quality (e.g., value of 0 to 1, 0 to 100, among others) of an extracted patch using one or more algorithms or trained models. The control unit 116 can determine the quality of a patch using features of a patch include clarity of lines, blurriness, occlusions, among others. The control unit 116 can compare a determined quality of a patch to a threshold value. Based on the comparison, the control unit 116 can determine whether to discard a patch or to process or store the patch.

In another example, the control unit 116 can determine a current bandwidth of one or more processors operating the object detector 128. In some implementations, the object detector 128 is operated by a cloud computing system. In some implementations, the object detector 128 is operated by a system included in the control unit 116. The system (e.g., cloud based or internal) operating the object detector 128 can transmit processing load data to the control unit 116. The control unit 116 can determine, using processing load data received by the control unit 116, either a current processing load of the system or a projected future processing load. If a current or projected processing load satisfies a threshold, the control unit 116 can determine whether to store or provide patches to the system for processing. In general, when there is available bandwidth, the control unit 116 can provide patches to be processed and when there is not available bandwidth, the control unit 116 can store the patches.

In some implementations, the control unit 116 provides patches to a processing system operating the object detector 128 as processing bandwidth becomes available. For example, the control unit 116 can provide patches to a system (e.g., cloud based or internal) operating the object detector 128. In general, processing systems can operate one or both of the object detector 128 or the infestation engine 129. The control unit 116 can provide one or more patches to a system after receiving from the system an indication of available bandwidth. The control unit 116 can provide one or more patches to a system and, if after a set amount of time the control unit 116 does not receive response data acknowledging the provided patches or indicating a processing being or already performed, the control unit 116 can again provide the one or more patches.

The control unit 116 can store the one or more patches and keep providing the patches to be processed until they are processed, e.g., when a processing system has available bandwidth. A process scheduler of one or more processors operating the object detector 128 can incorporate processing patches provided to them into a schedule with one or more other operations requiring processing. In some implementations, a schedule of processing patches can be low, especially if the patches are stored and can be processed at any time, indicating that other processes are to be prioritized over the patch processing.

In general, object can be easier to detect in a cropped version of an image. There are fewer elements that operate as a distraction and grounds for error in a smaller image cropped on an area of interest for detection than a larger initial image. An image patch can look more like images in training sets (e.g., a training set only needs images of salmon's dorsal and adipose fin regions; it may not have lots of net, marine snow, or other distracting backgrounds or other elements).

In some implementations, whether the patch detector 122 provides patches to the object detector 128 depends on a processing load of the control unit 116. For example, the patch detector 122 can determine a current processing load or a projected processing load based on items to be processed by the object detector 128 in the future. Using a current or projected processing load, the patch detector 122 can determine how many, if any, patches to be sent to the object detector 128.

In some implementations, the patch detector 122 stores all patch detections and does not provide patches to the object detector 128. For example, the object detector 128 can obtain patches from the patch data 127 as the object detector 128 has available processing bandwidth.

The object detector 128 obtains one or more patches. In some implementations, the object detector 128 includes one or more trained models. For example, the object detector 128 can include a model trained to detect parasites, such as ectoparasites (e.g., sea lice). The object detector 128 can include a model trained to detect deformities of specific body parts within one or more patches. The deformities (e.g., short operculum) can be indicative of disease. The object detector 128 can include a model trained to detect visual abnormalities on a specific portion of a body. The abnormalities (e.g., color, size, among other features) can be indicative of disease (e.g., malnourished, skin condition, among others).

The object detector 128 provides object detection data to the infestation engine 129. In this case, the object detector 128 detects parasites on the fish 106 and the object detection data includes information of one or more detected parasites. The infestation engine 129 determines, using the object detection data, an infestation level within the fish pen 104.

In some implementations, the infestation engine 129 includes a trained model. For example, a trained model of the infestation engine 129 can be trained using obtained ground truth data of actual infestation numbers (e.g., obtained through manual counting, post-harvesting analysis, among others) and number of object detections. The control unit 116 can adjust one or more weights or parameters of the trained model such that predictions of the trained model using object detections as input, match the ground truth data of infestation level. After training, a trained model of the infestation engine 129 can be used to determine a population infestation level using object detections from a portion of fish within a pen, e.g., the fish pen 104.

In some implementations, the infestation engine 129 includes one or more fully or partially connected layers. Each of the layers can include one or more parameter values indicating an output of the layers. The layers of the infestation engine 129 can generate output indicating a severity of infestation within a population. An infestation level can be used to perform one or more actions.

In stage C, the control unit 116 determines an action based on output of the object detector 128. In some implementations, the infestation engine 129 determines an action based on processing one or more patches processed by the object detector 128. The infestation engine 129 can generate an infestation level, e.g., an average number of fish that are diseased, a percentage of fish that are diseased, infestation severity for one or more fish, among others. The infestation engine 129 can compare the infestation level to one or more thresholds, e.g., a threshold average number of fish that are diseased, a threshold percentage of fish that are diseased, a threshold infestation severity for one or more fish, among others. If the infestation level satisfies one or more thresholds, the control unit 116 can determine an action (e.g., sorting, providing medicine, treatment processing, among others) to perform.

In some implementations, the control unit 116 determines an adjustment of feed using the feed controller unit 130 controlling the feed system 132. The control unit 116 can provide the output of the infestation engine 129 or a control signal to the feed controller unit 130. Depending on the data received from the control unit 116, the feed controller unit 130 can either process the output of the infestation engine 129 to determine an adjustment of feed and provide a control signal to the feed system 132 or can provide the control signal provided by the control unit 116 to the feed system 132.

In some implementations, the control unit 116 provides a control signal to an actuator. For example, the actuator can be part of a sorting system to sort one or more fish from one or more other fish. The control unit 116 can sort the fish 106 based on disease. Fish with disease, or disease above a threshold severity (e.g., detections of diseased elements per fish or detections of severely diseased elements based on known appearances of severely diseased elements on a fish) can be sorted from one or more fish in the fish pen 104. In some cases, diseased fish can be sorted into another pen.

In some implementations, the control unit 116 includes the feed controller unit 130. For example, the control unit 116 may control both the processing of the images in the data 110 and the adjustments to the feeding by controlling the feed system 132.

In some implementations, the control unit 116 adjusts feeding to provide feed to a certain area of the fish pen 104. For example, the obtained data 110 can include positions of the fish detected within the images of the obtained data 110. The control unit 116 can determine based on one or more subpopulations detected by the control unit 116 that a given subpopulation requires additional feed or additional medication for one or more detected diseases.

The control unit 116 can send a control signal to the feed system 132 or to the control unit 130 for the feed system 132 configured to adjust the location of an output of feed. The control unit 116 can adjust the location of an output of feed to a location of one or more fish within a particular subpopulation or an average location of the subpopulation.

In some implementations, the feed system 132 includes multiple food types. For example, the controller unit 130 can provide control messages to the feed system 132 to change the food type provided to the fish 106. In some cases, the multiple food types include a medicated food type and a non-medicated food type. In some cases, the multiple food types include food with a particular nutritional value and food with a different nutritional value.

The controller unit 130 can determine, based on data from the control unit 116, which food to provide to the fish 106, how much food to provide, when to provide the food, and at what rate to provide the food. In general, the controller unit 130 can generate a meal plan based on data from the control unit 116 where the meal plan includes one or more of: a feed type (e.g., type of medicated feed), a feed rate, a feed time, and a feed amount.

In some implementations, the control unit 116 includes multiple computer processors. For example, the control unit 116 can include a first and a second computer processor communicably connected to one another. The first and the second computer processor can be connected by a wired or wireless connection. The first computer processor can perform one or more of the operations of the fish detector 118, the patch detector 122, the object detector 128, or the infestation engine 129. The first computer processor can store or provide data to or from any of the fish detector 118, the patch detector 122, the object detector 128, or the infestation engine 129.

Similarly, the second computer processor can perform one or more of the operations of the fish detector 118, the patch detector 122, the object detector 128, or the infestation engine 129. The second computer processor can store or provide data to or from any of the fish detector 118, the patch detector 122, the object detector 128, or the infestation engine 129. Operations not performed by the first computer processor can be performed by the second computer processor or an additional computer processor. Operations not performed by the second computer processor can be performed by the first computer processor or an additional computer processor.

In some implementations, the control unit 116 operates one or more processing components, such as the fish detector 118, the patch detector 122, the object detector 128, or the infestation engine 129. In some implementations, the control unit 116 communicates with an external processor that operates one or more of the processing components. The control unit 116 can store data used to train one or more models of the processing components or can communicate with an external storage device that stores training data.

In some implementations, an image patch identified by the patch detector 122 is a portion (e.g., 10 percent) of an original image captured by the camera device 102. An original image can be captured from a mono camera, stereo camera, or a setup with more than two cameras. In some implementations, blue and green, or other color combination lights (e.g., blue and red, among others), are used to illuminate images captured by the camera device 102. For example, images can be captured in pairs where one image of the pair is illuminated with a first color light (e.g., blue) and another image of the pair is illuminated with a second color light (e.g., red). Other colors or frequencies of light can be used.

In some implementations, an image patch identified by the patch detector 122 is a portion (e.g., 10 percent) of a downsampled image generated using an original image captured by the camera device 102. Graphical representations of patches 124a and 124b are shown in image 124 of FIG. 1. The patch 124a is identified behind the adipose fin of the fish 115. The patch 124b is identified behind the dorsal fin of the fish 113.

In some implementations, portions that are occluded, or partially occluded or obscured are not extracted as patches. For example, the patch detector 122 can detect the region corresponding to the patch 124a. The patch detector 122 can determine that the region corresponding to the patch 124a is partially occluded by the fish 113. The patch detector 122 can remove the detected patch 124a from patches 126 for subsequent processing.

In some implementations, obscuring, e.g., marine snow, dust, atmospheric effects, among others, degrade a quality of a patch. For example, patches on a fish far away from a camera can be detected. Due to the distance and debris in the water, the quality of any detected patch more than a threshold distance from a camera can be low. Based on a quality determination, the patch detector 122 can determine one or more patches for subsequent processing. Quality determination can include processing by a model trained to determine one or more values indicating a quality of an image. Quality can indicate the confidence or accuracy of subsequent object detection using that image.

In some implementations, the patch detector 122 detects relevant patches of images for processing by detecting specific elements of objects. For example, the patch detector 122 can include an image recognition algorithm trained to detect the locations of adipose fins or dorsal fins of salmon. The patch detector 122 can identify a specific element, e.g., an adipose fin, and detect a relevant patch using the location of the specific element. For example, the patch detector 122 can generate patches that have one edge at the start of a location corresponding to an adipose fin and that extend for a fixed or variable amount away from the location or extend to another detected element to generate an area on an image. The patch detector 122 can detect the area and extract or identify the area as a patch for processing. In some implementations, patches, e.g., patches 126, include an x by y pixel portion of an X by Y pixel image, e.g., image 112, where x is less than X and y is less than Y. Patches can include the same number of pixels as a corresponding portion of the X by Y image or can be sampled, either up or down, to include more pixels than the corresponding portion of the X by Y. A system can be optimized to include enough pixels for accurate image analysis while minimizing image size to reduce storage and increase processing efficiency.

In some implementations, a feedback system is used with a set of image patches where initial patches, for a given detection goal (e.g., parasite detection), are high definition and include many pixels. The control unit 116 can process patches and generate detection results, e.g., from the object detector 128. The control unit 116 can compare the detection results with ground truths. If the accuracy of the detection results satisfy a threshold, the control unit 116 can process an additional round. For the additional round, the control unit 116 or connected system can downsample the patches by an amount so that they include fewer pixels. Adjacent pixels can be averaged together. Downsampling algorithms can be used. The downsampled patches can be processed by the control unit 116 to generate detection results, obtained by a detection system, e.g., the object detector 128. Again, the control unit 116 can compare the detection results to a threshold. This can continue until detection result accuracy does not satisfy a threshold. The control unit 116 can upsample or revert back the patches from that round to a previous round fidelity. For future processing, the system, such as the system 100 and the control unit 116 can downsample patches to a degree indicated by the iterative approach described above to optimize the resolution needed for accurate detection while minimizing storage.

In some implementations, there are no patches in an image. In some implementations, there are many (e.g., 10, 100, 1000) of patches in an image. In some implementations, the location of a patch of interest is different for different objects to detect or different fishes. For example, for sea lice on some salmon, the region of interest can be behind fins (e.g., dorsal, adipose, among others) of salmon because lice tend to congregate there. In general, regions of interest can depend on species or type of animal and can be defined in relation to body parts of a given animal based on an element to detect (e.g., sea lice, ectoparasite, bruises, among others) and the type or species of animal.

In some implementations, object detection includes detecting features that indicate a disease. For example, object detection can include detecting a jaw length to determine if a fish suffers from a shortened jaw disease. In some implementations, the control unit 116 determines locations of patches of interest for a new disease or other object detection. For example, the control unit 116 can collect data or obtain scientific data from a user on where a disease tends to affect fish to identify patches of interest. Some bacterial infections can result in reddening of a belly of a fish. A patch of interest to detect the disease can include a fish's belly.

In some implementations, the control unit 116 includes a detection model that processes full images to generate a training set that identifies where regions of interest tend to be for a corresponding disease. For example, a detection model can process images of known diseased fish. The detection model can determine one or more characteristics that the diseased fish have in common. In some implementations, a user checks areas of interest for a given disease based on predictions generated by the detection model. For example, a user can use scientific understanding of diseases to determine what areas of a fish would be logically affected.

In some implementations, the control unit 116 processes full images before processing new images, such as the image data 110. For example, the control unit 116 can process one or more images to determine one or more regions of interest for a given disease. After determining what regions are of interest, the control unit 116 can perform the patch detection and object detection described in reference to FIG. 1 to detect the given disease in a population of fish. The control unit 116 can then perform an action in response to detecting a threshold amount of the given disease.

In some implementations, patches are processes asynchronously. For example, if there are many patches of interest in an image, it might not be possible to process all patches at once given computational constraints. A patch can be saved for processing at a later time (e.g., when there is less computational load on the system). Saving just 10% of an image takes less space than saving 100% of an image. Based on schooling of fish, images obtained from the camera device 102 may suddenly be filled with fish as a school swims past a camera of the camera device 102 or the camera device 102 moves past a school. Images of schools of fish, where there may be many areas of interest, may be obtained following or preceding images of empty water. The system 100 described in FIG. 1 can help solve the issue of unequalized process requirements of obtained images while reducing storage requirements and decreasing processing time.

In some implementations, a first number of patches detected by the patch detector 122 are provided to the object detector 128 for further processing. In general, processing some patches is better than processing none, or better than having biases when the computer is overwhelmed. This approach may be useful with constrained storage requirements or cost concerns that make storage of detected patches infeasible.

Biases when a computer, such as the control unit 116, is overwhelmed, includes undercounting when there are more patches of interest identified than the object detector 128 can process given processing constraints. In this case, a system can miss opportunities to count lice when there are many fish in a scene and may have a bias where the system undercounts when there are many fish swimming by.

In some implementations, the patch detector 122 includes a keypoint detector. For example, a keypoint detector of the patch detector 122 can detect keypoints, e.g., dorsal or adipose keypoints, and determine one or more areas of interest based on the detected key points. Areas of interest can include orienting a window identifying a portion of an obtained image that includes a detected key point and a fixed or variable amount of surrounding image. Areas of interest can include determining a portion of an obtained image from one detected key point to another or from one detected key point to an area between the detected key point and another detected key point.

In some implementations, the patch detector 122 includes an object detector. For example, an object detector of the patch detector 122 can determine a bounding box around one or more areas of interest. In some implementations, the patch detector 122 includes a segmentation model that determines an outline of an object, such as a fish. In some implementations, the patch detector 122 includes a motion detector that determines moving outlines of an object, such as a fish. In general, areas of interest can include portions of a body of a fish, cow, or other object whose image is being processed by the control unit 116. Although the example of fish is used within this application, the techniques described can be applied to other objects, such as cattle, livestock, merchandise, products from manufacturing, among others.

These methods of identifying patches of interest, among others, can be performed on partial resolution versions of images (e.g., a 2000 by 2000 pixel image can be reduced to 600 by 600 pixels before going into a model, such as the patch detector 122).

Figure 2:
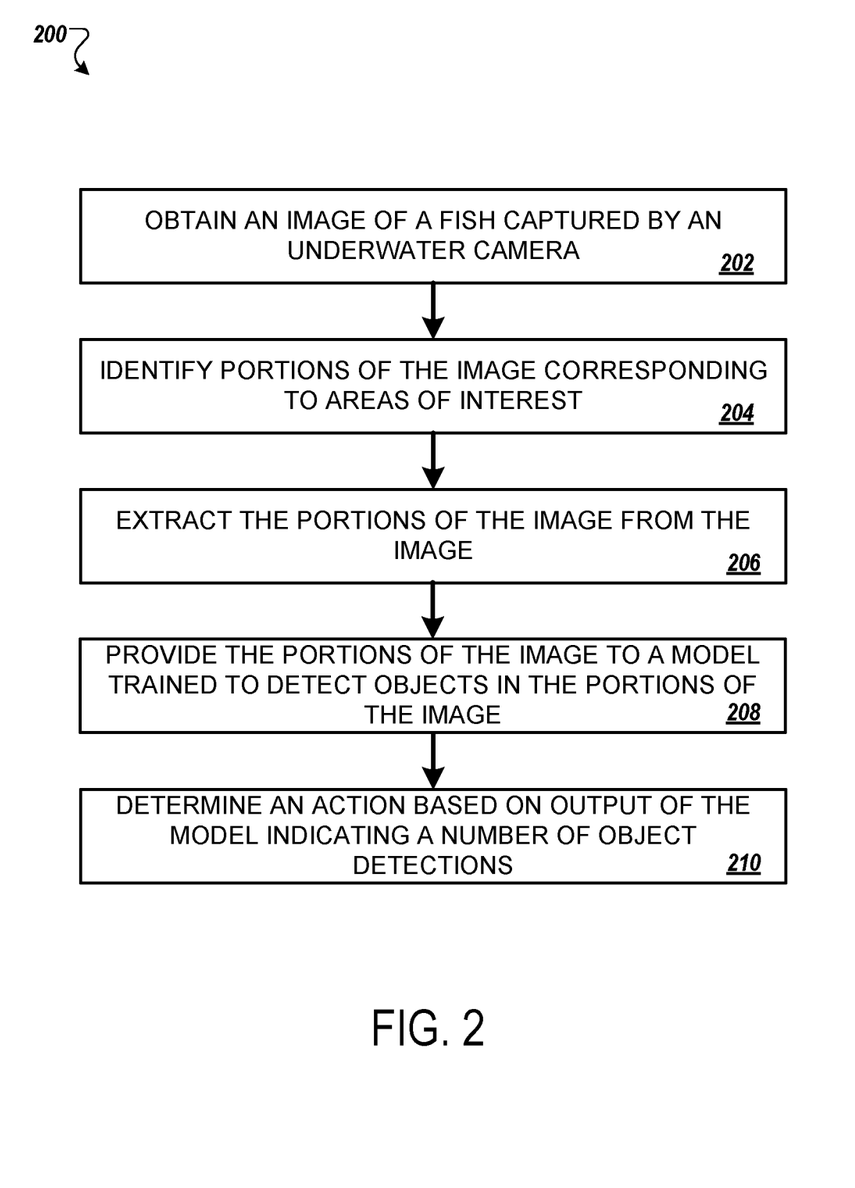
FIG. 2 is a flow diagram showing an example of a process for enhanced object detection.

FIG. 2 is a flow diagram showing an example of a process 200 for enhanced object detection. The process 200 may be performed by one or more systems, for example, the system 100 of FIG. 1.

The process 200 includes obtaining an image of a fish captured by an underwater camera (202). For example, the control unit 116 can capture image data 110 from the camera device 102.

The process 200 includes identifying portions of the image corresponding to areas of interest (204). For example, the control unit 116 can provide image data 110 to the fish detector 118 and the patch detector 122. The patch detector 122 can identify portions along bodies of the fish, such as the fish 113 and 115, as areas of interest and extract the areas of interest as patches for subsequent processing.

The process 200 includes extracting the portions of the image from the image (206). For example, the patch detector 122 can extract data corresponding to a portion of one or more images of the image data 110. The extracted data can include data from one or more pixels representing the portion.

In some implementations, the patch detector 122 extracts portions from an image that is downsampled. The patch detector 122 can run on downsampled images to reduce processing requirements for a system. In some implementations, after extracting portions from a downsampled image, the patch detector 122 provides upsampled data for subsequent processing. For example, the patch detector 122 can detect a region as a patch for subsequent processing and then provide a corresponding region from a full resolution, or original resolution, image as a patch for subsequent processing.

The process 200 includes providing the portions of the image to a model trained to detect objects in the portions of the image (208). For example, the control unit 116 can provide data of one or more extracted patches to the object detector 128. The object detector can include one or more models trained to detect objects.

The process 200 includes determining an action based on output of the model indicating a number of object detections (210). For example, the infestation engine 129 can obtain detections from the object detector 128. Based on the detections and prior training using one or more detections and ground truth data of infestation levels, the infestation engine 129 can generate a value indicating an infestation level for the population of fish in the fish pen 104.

In some implementations, the action includes adjusting a feeding system providing feed to fish. For example, the control unit 116 can provide the output of the infestation engine 129 or a control signal to the feed controller unit 130. Depending on the data received from the control unit 116, the feed controller unit 130 can either process the output of the infestation engine 129 to determine an adjustment of feed and provide a control signal to the feed system 132 or can provide the control signal provided by the control unit 116 to the feed system 132.

In some implementations, the action includes sending data to a user device, where the data is configured to, when displayed on the user device, present a user of the user device with a visual representation of disease in a population. In some implementations, the control unit 116 waits for feedback from a user who is provided, e.g., by the control unit 116, a visual representation to confirm an action determined by the control unit 116, such as a feed adjustment.

Figure 3:
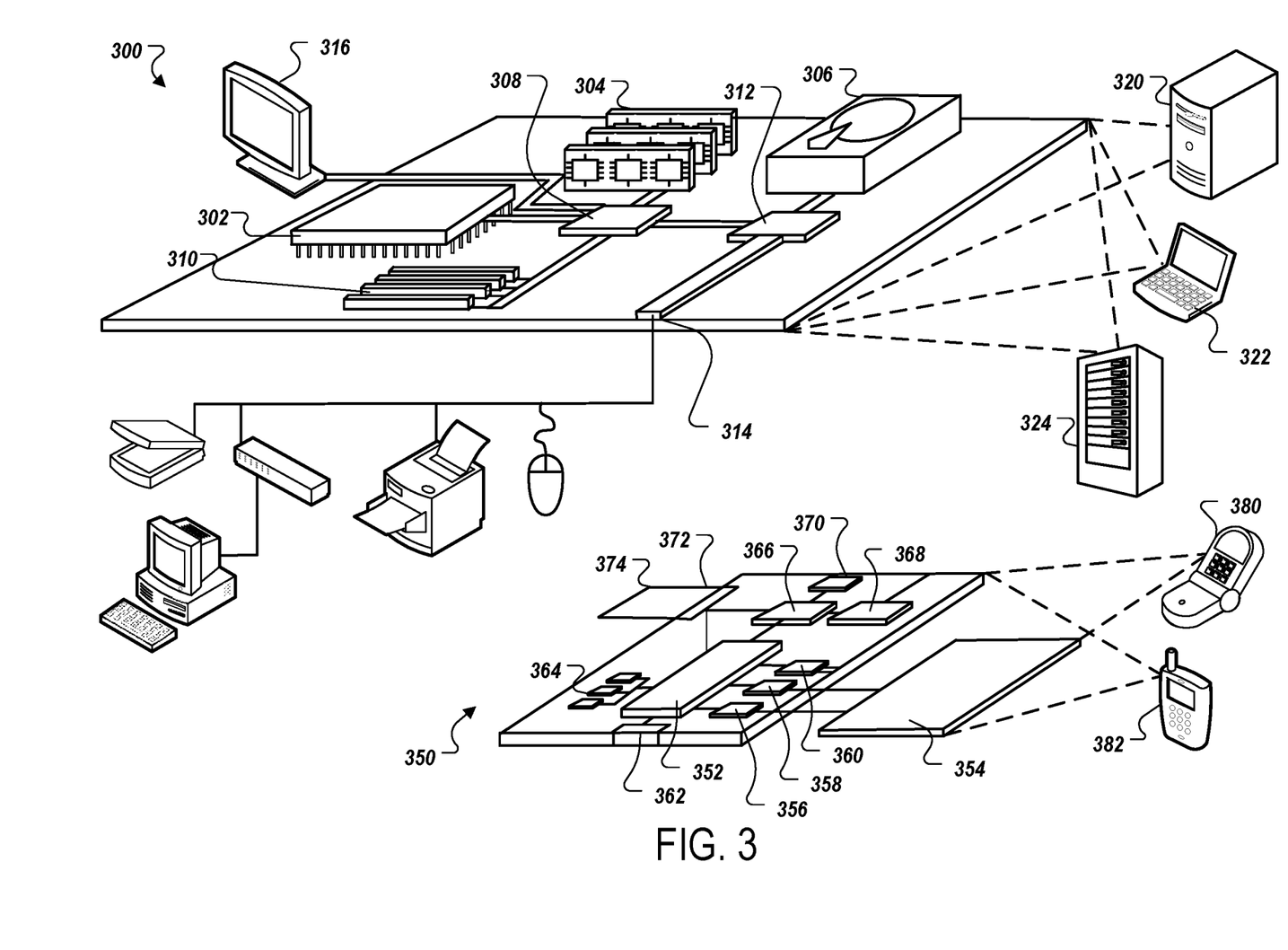
FIG. 3 is a diagram illustrating an example of a computing system used for enhanced object detection.

FIG. 3 is a diagram illustrating an example of a computing system used for enhanced object detection. The computing system includes computing device 300 and a mobile computing device 350 that can be used to implement the techniques described herein. For example, one or more components of the system 100 could be an example of the computing device 300 or the mobile computing device 350, such as a computer system implementing the control unit 116, devices that access information from the control unit 116, or a server that accesses or stores information regarding the operations performed by the control unit 116.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a Graphical User Interface (GUI) on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 302 is a single threaded processor. In some implementations, the processor 302 is a multi-threaded processor. In some implementations, the processor 302 is a quantum computer.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine readable mediums (for example, the memory 304, the storage device 306, or memory on the processor 302). The high-speed interface 308 manages bandwidth-intensive operations for the computing device 300, while the low-speed interface 312 manages lower bandwidth-intensive operations. Such allocation of functions is an example only. In some implementations, the high speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may include one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (nonvolatile random access memory). In some implementations, instructions are stored in an information carrier such that the instructions, when executed by one or more processing devices (e.g., processor 352), perform one or more methods, such as those described above. The instructions can also be stored by one or more storage devices, such as one or more computer or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry in some cases. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 3G/6G cellular, among others. Such communication may occur, for example, through the transceiver 368 using a radio frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, among others) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
    obtaining an image of a fish captured by an underwater camera;
    identifying portions of the image corresponding to one or more areas of interest;
    extracting the portions of the image from the image;
    determining, at different times, a processing load of a model that is trained to detect objects in the portions of the image;
    when the processing load of the model satisfies a threshold at an earlier time, storing the extracted portions of the image in a database of portions that are to be later processed by the model;
    when the processing load of the model does not satisfy the threshold at a later time, providing the stored portions of the image to the model; and
    determining an action based on output of the model indicating a number of object detections.

2. The method of claim 1, comprising:
    obtaining a type of object to be detected by the trained model.

3. The method of claim 2, comprising:
    determining one or more of the areas of interest as areas that typically include the type of object to be detected.

4. The method of claim 1, wherein the objects include parasites.

5. The method of claim 4, wherein the areas of interest include regions behind dorsal or adipose fins.

6. The method of claim 1, comprising:
    generating a value indicating a level of infestation within a population that includes the fish.

7. The method of claim 6, wherein the value is generated for the population by a model trained to determine infestation for a given population using objects detected on a portion of the given population.

8. The method of claim 1, comprising:
    detecting the fish within the image using a model trained to detect fish.

9. The method of claim 8, wherein the areas of interest include portions of the detected fish.

10. The method of claim 1, wherein the action comprises:
    adjusting a feeding system providing feed to the fish.

11. The method of claim 1, wherein the action comprises:
    sending data indicating the output of the model to a user device, wherein the data is configured to, when displayed on the user device, present a user of the user device with a visual representation of disease in a population that includes the fish.

12. The method of claim 1, wherein determining the action comprises:
    determining to adjust a position or operation of an item of motorized equipment.

13. A non-transitory, computer-readable medium storing one or more instructions executable by a computer system to perform operations comprising:
    obtaining an image of a fish captured by an underwater camera;
    identifying portions of the image corresponding to one or more areas of interest;
    extracting the portions of the image from the image;
    determining, at different times, a processing load of a model that is trained to detect objects in the portions of the image;

when the processing load of the model satisfies a threshold at an earlier time, storing the extracted portions of the image in a database of portions that are to be later processed by the model;

when the processing load of the model does not satisfy the threshold at a later time, providing the stored portions of the image to the model; and determining an action based on output of the model indicating a number of object detections.

14. The non-transitory, computer-readable medium of claim 13, wherein the operations comprise:
obtaining a type of object to be detected by the trained model.

15. The non-transitory, computer-readable medium of claim 14, wherein the operations comprise:
determining one or more of the areas of interest as areas that typically include the type of object to be detected.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining an image of a fish captured by an underwater camera;

identifying portions of the image corresponding to one or more areas of interest; extracting the portions of the image from the image;

determining, at different times, a processing load of a model that is trained to detect objects in the portions of the image;

when the processing load of the model satisfies a threshold at an earlier time, storing the extracted portions of the image in a database of portions that are to be later processed by the model;

when the processing load of the model does not satisfy the threshold at a later time, providing the stored portions of the image to the model; and determining an action based on output of the model indicating a number of object detections.

* * * * *

UNITED STATES PATENT AND TRADEMARK OFFICE
CERTIFICATE OF CORRECTION

PATENT NO. : 12,322,173 B2  
APPLICATION NO. : 17/880892  
DATED : June 3, 2025  
INVENTOR(S) : Grace Calvert Young Page 1 of 1

It is certified that error appears in the above-identified patent and that said Letters Patent is hereby corrected as shown below:

On the Title Page

Column 1, Line 1: (item (73) Assignee):
Delete "TidalX" and insert -- TidalX --

In the Claims

Column 20, Line 7, in Claim 16:
Delete "extracting the portions of the image from the image"

Column 20, Line 8, in Claim 16:
Insert -- extracting the portions of the image from the image; --

Signed and Sealed this  
Seventh Day of October, 2025

John A. Squires  
*Director of the United States Patent and Trademark Office*